UNITED STATES PATENT OFFICE.

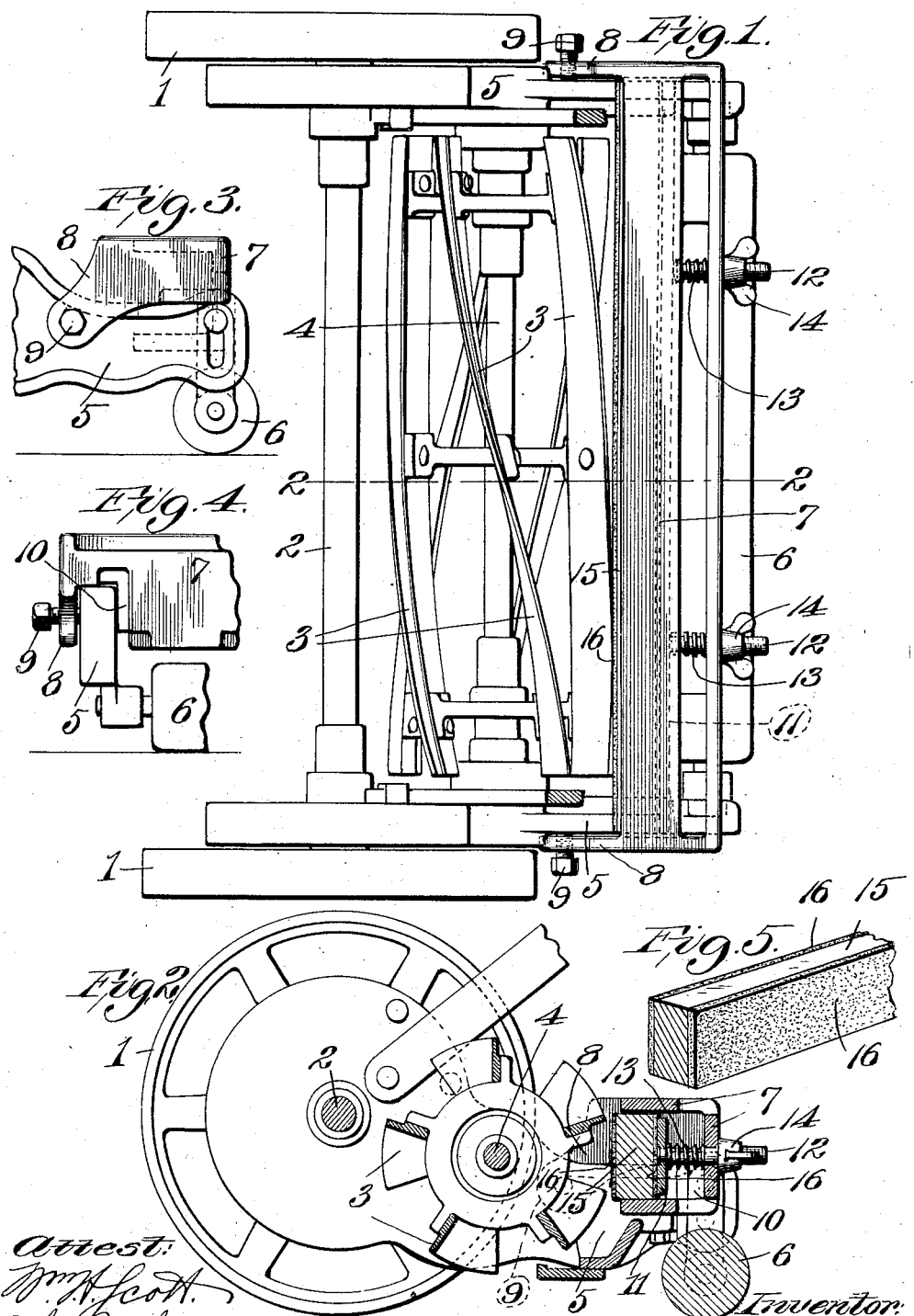

MIKKEL JOHANSEN, OF MAPLEWOOD, MISSOURI.

LAWN-MOWER SHARPENER.

1,047,814.  Specification of Letters Patent.  Patented Dec. 17, 1912.

Application filed December 26, 1911. Serial No. 667,900.

*To all whom it may concern:*

Be it known that I, MIKKEL JOHANSEN, a citizen of the United States, and resident of Maplewood, St. Louis county, Missouri, have invented certain new and useful Improvements in Lawn-Mower Sharpeners, of which the following is a specification containing a full, clear, and exact description, reference being had to the accompanying drawings, forming a part hereof.

My invention relates to lawn mower sharpeners, and has for its object the construction of a sharpener which can be readily detached and applied to a mower without affecting any change in the construction of the mower itself.

With the above purposes in view, my invention consists in certain novel features of construction and arrangement of parts which will be hereinafter more fully described, set forth in the claims, and illustrated in the accompanying drawings, in which:

Figure 1 is a top plan view of a conventional type of lawn mower having my invention applied thereto; Fig. 2 is a transverse section of the mower with my invention applied thereto, taken on the line 2—2 of Fig. 1; Fig. 3 is a detailed view of a part of the lawn mower frame, showing the sharpener in end elevation; Fig. 4 is a detailed rear view of a part of the lawn mower frame and roller, showing my sharpener applied; and Fig. 5 is an enlarged perspective view of the sharpening plate removed from the casing.

As heretofore stated, my invention is constructed to be readily attached to and detached from any conventional type of lawn mower, and is made in suitable sizes to fit the various sizes of lawn mowers.

I have shown my invention applied to a lawn mower of the conventional type, wherein—

1 indicates the wheels, 2 the axle connecting the wheels, 3 the blades, and 4 the shaft on which the blades are mounted.

5 indicates the parts or members of the mower in which the roller 6 is mounted, and to which my sharpener is usually applied.

The sharpener itself is composed of a casing 7, provided with ears 8, in which ears 8 are located set screws 9. These set screws 9 are passed through the ears or arms 8 and are adapted to engage with the outside faces or surfaces of the parts 5 of the lawn mower frame, and by means of which the sharpener is affixed to the mower. The ears 8 are slightly depending, as illustrated in Fig. 3, and are located on the outside of the members 5, and the body or casing 7 is provided with a recess or cut away portion 10 at each end, in which are seated the members 5, as illustrated in Fig. 4.

The casing 7 is arranged above the parts or members 5 when the sharpener is applied to the mower, and is practically supported thereby in a horizontal position. Mounted in the casing 7 is a follower 11, and mounted in the rear of the follower 11 on screw threaded pins 12 are springs 13. The screw threaded pins 12 pass through the casing 7, and are provided with thumb nuts 14. By this construction the follower 11 is yieldingly mounted within the casing 7, and by means of the thumb nuts 14 the tension on the springs 13 may be regulated, and consequently the tension of the follower 11 may be regulated or adjusted.

Mounted in the casing 7 in front of the yielding follower 11 is a sharpening block 15, provided on opposite sides with abrasive or grinding faces 16. The sharpening block is preferably made out of wood and has applied to its opposite faces a layer or coating of emery powder, which is secured to the block by means of glue or any suitable adhesive material. The sharpening block 15 may be removed from the casing and when one face has been worn it may be reversed to use the opposite face. When the sharpening block 15 is positioned in the casing 7 and the casing 7 is applied to the mower, the abrasive face of the sharpening block occupies substantially a vertical position, so that the edges of the blades 3 may contact or engage with the same when the blades are revolved in the operation of the mower over the surface of the ground. In other words, the sharpening block 15 is adapted to yieldingly engage the edges of the blades of the mower as the blades are revolved. By being able to vary the tension of the follower and consequently the grinding block 15 resting against the follower, the pressure of the grinding block against the edges of the blades may be regulated.

In the operation of my sharpener, it is applied to the mower as described without removing or changing any of the parts of the mower, and by operating the mower forwardly the blades of the mower are brought into contact with the grinding block, and the sharpening of the blades is effected, and when the sharpening of the blades has been completed, the sharpener is easily and readily removed from the mower by loosening the set screws 9.

My improved sharpener is easily and readily attached to and detached from a mower, is simple in construction, and by its use I have been enabled to sharpen a mower quickly and successfully.

I claim:

A sharpener for lawn mowers, comprising a casing having its front wall removed, opposite depending perforated ears at the ends of said casing, screws threaded through said ears for attaching and detaching said casing to and from the mower frame, a follower located in said casing, screw-threaded pins carried by said follower, springs mounted on said screw-threaded pins, thumb-nuts located on said screw-threaded pins for regulating the tension of said springs, and a removable and reversible sharpening block located in said casing in contact with said follower.

In testimony whereof, I have signed my name to this specification, in presence of two subscribing witnesses.

MIKKEL JOHANSEN.

Witnesses:
EDWARD E. LONGAN,
E. L. WALLACE.

Copies of this patent may be obtained for five cents each, by addressing the "Commissioner of Patents, Washington, D. C."